(12) United States Patent
Choi et al.

(10) Patent No.: US 9,786,891 B2
(45) Date of Patent: Oct. 10, 2017

(54) ELECTRODE ASSEMBLY AND LITHIUM SECONDARY BATTERY COMPRISING THE SAME

(71) Applicant: LG Chem, Ltd., Seoul (KR)

(72) Inventors: Jung-Seok Choi, Daejeon (KR); Song-Taek Oh, Daejeon (KR); Su-Rim Lee, Daejeon (KR); Hyeok-Moo Lee, Daejeon (KR); Ji-Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 204 days.

(21) Appl. No.: 14/436,264

(22) PCT Filed: Oct. 31, 2014

(86) PCT No.: PCT/KR2014/010388
§ 371 (c)(1),
(2) Date: Apr. 16, 2015

(87) PCT Pub. No.: WO2015/065118
PCT Pub. Date: May 7, 2015

(65) Prior Publication Data
US 2016/0028064 A1   Jan. 28, 2016

(30) Foreign Application Priority Data

Oct. 31, 2013   (KR) .................. 10-2013-0131681
Oct. 31, 2014   (KR) .................. 10-2014-0149996

(51) Int. Cl.
*H01M 2/16* (2006.01)
*H01M 4/62* (2006.01)
*H01M 4/485* (2010.01)
*H01M 4/505* (2010.01)
(Continued)

(52) U.S. Cl.
CPC ....... *H01M 2/1686* (2013.01); *H01M 2/1646* (2013.01); *H01M 2/1653* (2013.01);
(Continued)

(58) Field of Classification Search
None
See application file for complete search history.

(56) References Cited

U.S. PATENT DOCUMENTS

2010/0261047 A1   10/2010   Kim et al.
2010/0316903 A1   12/2010   Kim et al.
(Continued)

FOREIGN PATENT DOCUMENTS

CN    101874319 A    10/2010
CN    102064300 A    5/2011
(Continued)

OTHER PUBLICATIONS

International Search Report for Application No. PCT/KR2014/010388 dated Mar. 9, 2015.

*Primary Examiner* — Wyatt McConnell
(74) *Attorney, Agent, or Firm* — Lerner, David, Littenberg, Krumholz & Mentlik, LLP

(57) ABSTRACT

An electrode assembly, comprises one or more first electrodes comprising a cathode; one or more second electrodes comprising an anode; and a separator sheet having a zigzag form interposed therebetween. The separator sheet comprises a first porous polymer substrate; a first coating layer formed on one surface of the first porous polymer substrate and comprising a polymer binder, the first coating layer being faced with the cathode; and a second coating layer formed on the other surface of the first porous polymer substrate and comprising a mixture a polymer binder and inorganic particles, the second coating layer being faced with the anode and having a composition, a thickness and a porosity different from those of the first porous coating layer. A separator has porous coating layers with a different composition, thickness or porosity formed on each surface thereof.

27 Claims, 4 Drawing Sheets

(51) Int. Cl.

| | | |
|---|---|---|
| *H01M 4/525* | (2010.01) | |
| *H01M 4/58* | (2010.01) | |
| *H01M 2/18* | (2006.01) | |
| *H01M 10/04* | (2006.01) | |
| *H01M 10/0583* | (2010.01) | |
| *H01M 10/052* | (2010.01) | |

(52) U.S. Cl.
CPC ............ *H01M 2/18* (2013.01); *H01M 4/485* (2013.01); *H01M 4/505* (2013.01); *H01M 4/525* (2013.01); *H01M 4/5825* (2013.01); *H01M 4/622* (2013.01); *H01M 10/0459* (2013.01); *H01M 10/0583* (2013.01); *H01M 10/052* (2013.01)

(56) References Cited

U.S. PATENT DOCUMENTS

| | | |
|---|---|---|
| 2012/0251869 A1 | 10/2012 | Lee et al. |
| 2013/0011715 A1 | 1/2013 | Lee et al. |
| 2013/0280583 A1 | 10/2013 | Lee et al. |
| 2014/0308566 A1 | 10/2014 | Saito et al. |
| 2014/0370358 A1 | 12/2014 | Hong et al. |

FOREIGN PATENT DOCUMENTS

| | | |
|---|---|---|
| EP | 1201005 A1 | 5/2002 |
| JP | 2013054966 | 3/2013 |
| KR | 2008-0095770 A | 10/2008 |
| KR | 20120035858 A | 4/2012 |
| KR | 20130006256 A | 1/2013 |
| KR | 20130052526 A | 5/2013 |
| KR | 20130066746 A | 6/2013 |
| WO | 2013077162 A1 | 5/2013 |

ELECTRODE ASSEMBLY AND LITHIUM SECONDARY BATTERY COMPRISING THE SAME

CROSS REFERENCE TO RELATED APPLICATIONS

The present application is a national phase entry under 35 U.S.C. §371 of International Application No. PCT/KR2014/010388, filed Oct. 31, 2014, which claims priority from Korean Patent Application No. 10-2014-0149996, filed Oct. 31, 2014 and Korean Patent Application No. 10-2013-0131681, filed Oct. 31, 2013, all of which are hereby incorporated herein by reference.

TECHNICAL FIELD

The present disclosure relates to an electrode assembly, more specifically to an electrode assembly that has a separator sheet comprising porous coating layers being each formed to come into contact with a cathode and an anode selectively, and an electrochemical device comprising the electrode assembly.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion due to the use of an organic electrolyte solution, and are disadvantageously complicated to fabricate.

Many companies have produced a variety of lithium secondary batteries with different safety characteristics. It is very important to evaluate and ensure the safety of such lithium secondary batteries. In order to ensure such a safety, there has been proposed a separator having a porous coating layer formed by coating a mixture of inorganic particles and a polymer binder on at least one surface of a porous substrate having multiple pores. Also, in a recent separator preparation technique, separators have been prepared by applying the composition or thickness of the outermost porous coating layers asymmetrically, so that the surfaces of the separators to come into contact with a cathode and an anode are suitably matched with each of the two electrodes.

Meanwhile, the secondary batteries are classified according to the structure of an electrode assembly consisting of cathode/separator/anode, for example, into a jelly-roll (winding type) structure obtained by interposing a separator between a cathode and an anode which are in the form of a long sheet, followed by winding, or a stack-folding type structure obtained by winding bi-cells or full-cells with a long separator sheet continuously, the bi-cells or full-cells being obtained by laminating cathode units and anode units between which separators are interposed.

When the stack-folded electrode assembly is prepared according to the known method, the above-mentioned separator applying the composition or thickness of porous coating layers asymmetrically is difficult to be used because the selective contact of the separator with a cathode and an anode to be matched cannot be completely made due to the structural characteristic of the electrode assembly.

Meanwhile, in the jelly-roll type electrode assembly, the above-mentioned separator applying the composition or thickness of porous coating layers asymmetrically may be used to come into contact with a cathode and an anode selectively when considering the structure of this electrode assembly. However, since the jelly-roll type electrode assembly is prepared in by winding a cathode and an anode being a sheet form in the contact state thereof to form a cylindrical or oval cross-section, the electrode assembly is internally accumulated with stress caused by the expansion and contraction of electrodes during charging and discharging processes. When such a stress accumulation exceeds a certain limit, the electrode assembly is apt to be deformed. By the deformation of the electrode assembly, the space between the electrodes become un-uniform to deteriorate battery performances rapidly, and an internal short circuit is generated to threaten battery safety. Also, the winding of the cathode and the anode being a sheet form is difficult to maintain the uniform distance between the cathode and the anode, and the rapid winding thereof is also difficult, and thus it is unfavorable in terms of productivity.

DISCLOSURE

Technical Problem

The present disclosure is designed to solve the problems of the related art, and therefore the present disclosure is directed to providing an electrode assembly in which a separator having porous coating layers with different composition, thickness and porosity on each surface thereof is applied and each porous coating layer selectively comes into complete contact with a cathode and an anode to be matched, thereby preventing cell deterioration and improving safety; and a lithium secondary battery comprising the electrode assembly.

Technical Solution

In accordance with one aspect of the present disclosure, there is provided an electrode assembly, comprising one or more first electrodes comprising a cathode; one or more second electrodes comprising an anode; and a separator sheet interposed between the first electrodes and the second electrodes to be laminated alternately so as to separate them and having multiple folded portions, wherein the separator sheet comprises a first porous polymer substrate, a first coating layer formed on one surface of the first porous polymer substrate and comprising a polymer binder, the first coating layer being faced with the cathode, and a second coating layer formed on the other surface of the first porous polymer substrate and comprising a mixture a polymer binder and inorganic particles, the second coating layer being faced with the anode and having a composition, a thickness and a porosity different from those of the first porous coating layer.

In the present disclosure, the multiple folded portions in the separator sheet may be obtained by folding in a zigzag form, and the electrode assembly may have a zigzag-folded structure.

The first porous coating layer may have a porosity of 20 to 50%, and the second porous coating layer may have a porosity of 30 to 60%.

The thickness ratio of the first porous coating layer and the second porous coating layer may range from 1:9 to 4:6, and also the thickness ratio of the first porous coating layer and the second porous coating layer may range from 6:4 to 9:1.

In addition, the first porous coating layer may have a porosity of 20 to 50%, the second porous coating layer may have a porosity of 30 to 60%, and the thickness ratio of the first porous coating layer and the second porous coating layer may range from 1:9 to 9:1.

The first porous coating layer may further comprise inorganic particles.

The inorganic particles may be inorganic particles having a dielectric constant of 5 or higher, inorganic particles having the ability to transport lithium ions, or a mixture thereof.

The inorganic particles having a dielectric constant of 5 or higher may be any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$, $SiO_2$, AlOOH, $Al(OH)_3$, and a mixture thereof.

Also, the inorganic particles having the ability to transport lithium ions may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$), and a mixture thereof.

Meanwhile, the polymer binder may be selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

The first porous polymer substrate may be a polyolefin-based membrane or non-woven fabric.

Also, the first porous polymer substrate may be made of any one selected from the group consisting of high-density polyethylene, low-density polyethylene, linear low-density polyethylene, ultra-high molecular weight polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

In addition, the first porous polymer substrate may be formed in a single layer, or in a lamination of two or more layers.

Meanwhile, the cathode may have a cathode active material comprising a lithium-containing oxide. The lithium-containing oxide may be a lithium-containing transition metal oxide, for example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_b-Mn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0\leq y<1$), $Li_xCo_{1-y}Mn_yO_2$ ($0.5<x<1.3$, $0\leq y<1$), $Li_xNi_{1-y}Mn_yO_2$ ($0.5<x<1.3$, $O\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), $Li_xFePO_4$ ($0.5<x<1.3$), and a mixture thereof.

The anode may have an anode active material comprising metallic lithium, a carbon-based material, a metal compound or a mixture thereof.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

The first electrodes may consist of a single layer of cathode, and the second electrodes may consist of a single layer of anode.

Also, the first electrodes may comprise one or more cathodes, one or more anodes, and a separator interposed between the cathodes and the anodes to be laminated alternately so as to separate them.

The separator may comprise a second porous polymer substrate, a third coating layer formed on one surface of the second porous polymer substrate and comprising a polymer binder, the third coating layer being faced with the cathodes, and a fourth coating layer formed on the other surface of the second porous polymer substrate and comprising a mixture a polymer binder and inorganic particles, the fourth coating layer being faced with the anodes and having a composition, a thickness and a porosity different from those of the third porous coating layer.

The third porous coating layer may have a porosity of 20 to 50%, and the fourth porous coating layer may have a porosity of 30 to 60%.

The thickness ratio of the third porous coating layer and the fourth porous coating layer may range from 1:9 to 4:6, and also the thickness ratio of the third porous coating layer and the fourth porous coating layer may range from 6:4 to 9:1.

In addition, the third porous coating layer may have a porosity of 20 to 50%, the fourth porous coating layer may have a porosity of 30 to 60%, and the thickness ratio of the third porous coating layer and the fourth porous coating layer may range from 1:9 to 9:1.

In the present disclosure, the first porous coating layer and the third porous coating layer may have the same composition, thickness and porosity, and the second porous coating layer and the fourth porous coating layer may have the same composition, thickness and porosity.

Meanwhile, the second electrodes may comprise one or more anodes, one or more cathodes, and a separator interposed between the anodes and the cathodes to be laminated alternately so as to separate them.

The separator may comprise a second porous polymer substrate, a third coating layer formed on one surface of the second porous polymer substrate and comprising a polymer binder, the third coating layer being faced with the cathodes, and a fourth coating layer formed on the other surface of the second porous polymer substrate and comprising a mixture a polymer binder and inorganic particles, the fourth coating layer being faced with the anodes and having a composition, a thickness and a porosity different from those of the third porous coating layer.

In accordance with another aspect of the present invention, there is provided a zigzag-folded electrode assembly, comprising a plurality of first bi-cells, each first bi-cell having a cathode, a first separator, an anode, a second separator, and a cathode that are laminated in order; a plurality of second bi-cells, each second bi-cell having an anode, a second separator, a cathode, a first separator, and an anode that are laminated in order; and a separator sheet interposed between the first bi-cells and the second bi-cells to be laminated alternately so as to separate them and having multiple folded portions in a zigzag form, wherein the separator sheet comprises a first porous polymer substrate, a first coating layer formed on one surface of the first porous polymer substrate and comprising a polymer binder, the first coating layer being faced with the cathodes, and a second coating layer formed on the other surface of the first porous polymer substrate and comprising a mixture a polymer binder and inorganic particles, the second coating layer being faced with the anodes and having a composition, a thickness and a porosity different from those of the first porous coating layer, and the first separator and the second separator each independently comprise a second porous polymer substrate, a third coating layer formed on one surface of the second porous polymer substrate and comprising a polymer binder, the third coating layer being faced with the cathodes, and a fourth coating layer formed on the other surface of the second porous polymer substrate and comprising a mixture a polymer binder and inorganic particles, the fourth coating layer being faced with the anodes and having a composition, a thickness and a porosity different from those of the third porous coating layer.

Further, in accordance with still another aspect of the present invention, there is provided a lithium secondary battery, comprising an electrode assembly, a non-aqueous electrolyte solution to be impregnated into the electrode assembly; and a battery case for receiving the electrode assembly and the non-aqueous electrolyte solution, wherein the electrode assembly is the above-mentioned electrode assembly.

Advantageous Effects

In the electrode assembly according to the present disclosure, a separator having porous coating layers with a different composition, thickness or porosity formed on each surface thereof is applied and each porous coating layer selectively comes into complete contact with a cathode and an anode to be matched, without any mismatch.

Thereby, the porous coating layer being faced with the anode can prevent for pores of a porous substrate from being filled with by-product generated in the anode, and another porous coating layer being faced with the cathode can enhance mechanical property and eventually improve battery safety.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

Figure 1:
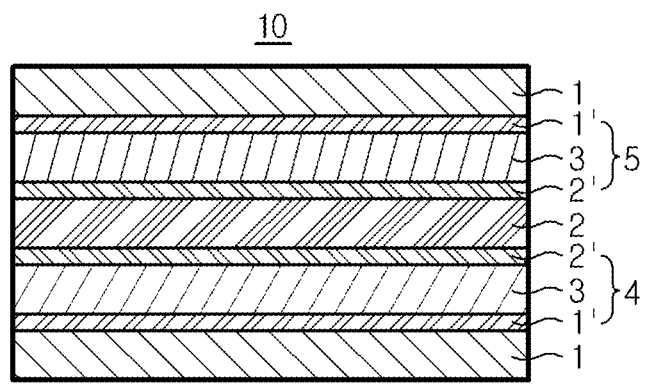
FIG. 1 shows a cross-section of an A-type bi-cell (a first bi-cell).

| <Explanation of Reference Numerals> | |
|---|---|
| 1: Cathode | 1': Third porous coating layer |
| 2: Anode | 2': Fourth porous coating layer |
| 3: Second porous substrate | 4: First separator |
| 5: Second separator | 10: First bi-cell |
| 10': First porous coating layer | 20: Second bi-cell |
| 20': Second porous coating layer | 30: First porous polymer substrate |
| 40: Separator sheet | 100: Zigzag-folded electrode assembly |

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the constitution of the embodiments and drawings presented herein is just a preferable example for the purpose of illustrations only, not intended to limit the scope of the disclosure, so it should be understood that other equivalents and modifications could be made thereto without departing from the spirit and scope of the disclosure.

One aspect of the present disclosure provides an electrode assembly, comprising one or more first electrodes comprising a cathode; one or more second electrodes comprising an anode; and a separator sheet interposed between the first electrodes and the second electrodes to be laminated alternately so as to separate them and having multiple folded portions, wherein the separator sheet comprises a first porous polymer substrate, a first coating layer formed on one surface of the first porous polymer substrate and comprising a polymer binder, the first coating layer being faced with the cathode, and a second coating layer formed on the other surface of the first porous polymer substrate and comprising a mixture a polymer binder and inorganic particles, the second coating layer being faced with the anode and having a composition, a thickness and a porosity different from those of the first porous coating layer.

Thus, the cathode and the anode are each selectively faced with a requisite one of the different porous coating layers.

From such a suitable match, the first porous coating layer being faced with the cathode can enhance mechanical property and eventually improve battery safety, and the second porous coating layer being faced with the anode can prevent for pores of a porous substrate from being filled and closed with by-product generated in the anode, thereby inhibiting the acceleration of battery deterioration.

The separator sheet may have multiple folded portions obtained by folding in a zigzag form, and the electrode assembly may have a zigzag-folded structure.

In the present disclosure, the first porous coating layer may have a porosity of 20 to 50%, and the second porous coating layer may have a porosity of 30 to 60%. Thus, when the second porous coating layer being faced with the anode has a higher porosity, the by-products of the anode can be prevented to fill and close the pores of the separator, thereby retarding the acceleration of cell deterioration.

The thickness ratio of the first porous coating layer and the second porous coating layer may range from 1:9 to 4:6, or 6:4 to 9:1, more preferably 2:8. Such a thickness ratio, i.e., asymmetrical coating amounts can prevent the by-products of the anode to fill and close the pores of the separator, thereby retarding the acceleration of cell deterioration, as mentioned above.

Further, when the porous coating layers satisfy both of such porosity range and such thickness ratio range, the above-mentioned effects can be achieved more effectively.

Meanwhile, the first porous coating layer may consist of only a polymer binder as mentioned above, or may consist of a mixture of a polymer binder and inorganic particles, similar to the second porous coating layer.

Also, the inorganic particles present in the porous coating layers act as a spacer capable of maintaining the physical form of the porous coating layer, thereby preventing the porous substrate from thermal shrinkage even if electrochemical devices overheat, and preventing the cathode and the anode from coming into direct contact even if the porous polymer substrate get damaged. Thus, the inorganic particles contribute to improve the safety of lithium secondary batteries.

The inorganic particles which may be used in the present disclosure are not particularly limited if they are electrochemically stable. That is, the inorganic particles which may be used in the present invention are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher. The inorganic particles having a dielectric constant of 5 or higher may be any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$, $TiO_2$, $SiO_2$, $AlOOH$, $Al(OH)_3$, and a mixture thereof.

Also, as the inorganic particles, inorganic particles having the ability to transport lithium ions, i.e., lithium-containing inorganic particles which can transfer lithium ions without holding them may be used. The inorganic particles having the ability to transport lithium ions may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$), and a mixture thereof.

The inorganic particles are not particularly limited to their size, but preferably have an average diameter of 0.001 to 10 μm for forming the porous coating in a uniform thickness and achieving a proper porosity.

Meanwhile, the polymer binders may be each independently selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

In the present disclosure, the first porous coating layer and the second porous coating layer, which are faced with the cathode and the anode, respectively, comprises a polymer binder(s) having high affinity with a binder(s) used in each of the cathode and the anode, thereby improving the adhesion of the cathode and the anode with the separator.

Meanwhile, the first porous polymer substrate used in the present invention may be any one which is conventionally used in electrochemical devices, for example, a polyolefin-based membrane or non-woven fabric, but the present invention is not particularly limited thereto.

The polyolefin-based membrane may be made of polyethylene such as high-density polyethylene, linear low-density polyethylene, low-density polyethylene and ultra-high molecular weight polyethylene, polypropylene, polybutylene, polypentene, or a mixture thereof.

The non-woven fabric may be made of polyolefin, as well as polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate, or a mixture thereof. Also, the non-woven fabric may be a spun-bonded or melt-blown fabric consisting of long fibers.

Also, the porous polymer substrate may have a thickness of 5 to 50 μm, but is not particularly limited thereto. The porous polymer substrate may have a pore size of 0.01 to 50 μm, and a porosity of 10 to 95%, but is not particularly limited thereto. In addition, the first porous polymer substrate may be formed in a single layer, or in a lamination of two or more layers.

Meanwhile, the cathode has the structure that a cathode active material layer comprising a cathode active material, a conductive material and a binder is applied on one or both surfaces of a current collector.

The cathode active material may comprise a lithium-containing oxide, preferably a lithium-containing transition metal oxide. Examples of the lithium-containing transition metal oxide may be any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_b Mn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3), and a mixture thereof. In addition, lithium-containing transition metal sulfide, selenide, or halide may also be used.

The conductive material is not particularly limited if it is an electrically conductive material which does not cause chemical change in an electrochemical device. As the conductive material, carbon black, graphite, carbon fiber, carbon nanotube, metal powders, and conductive metal oxides may be generally used, and examples of a commercially available conductive material include acetylene black series (Chevron Chemical Company or Gulf Oil Company), Ketjen Black EC series (Armak Company), Vulcan, XC-72 (Cabot Company) and Super P (MMM Carbon Company). For example, acetylene black, carbon black, and graphite may be mentioned.

Meanwhile, the anode has the structure that an anode active material layer comprising an anode active material and a binder is applied on one or both surfaces of a current collector.

The anode active material may be a carbon-based material, metallic lithium, a metal compound or a mixture thereof which can conventionally intercalate and disintercalate lithium ions.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $TiO_2$ and $SnO_2$), a nitride, a sulfide, a boride, an alloy with lithium and any other form. Among these, forms such as a combination, an alloy, an oxide and an alloy with lithium can provide high capacity to a battery. In particular, a compound containing at least one metal selected from Si, Ge and Sn, preferably Si and Sn can provide even higher capacity to a battery.

The binder used in the cathode and the anode functions to maintain cathode and anode active materials in a current collector and connect the active materials with each other, and may be any one which is conventionally used.

For example, various kinds of polymer binders including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for about 2 hours.

Also, the cathode active material layer has a thickness (per one side of a current collector) of 30 to 120 μm, preferably 50 to 100 μm, and the anode active material layer has a thickness of 1 to 100 μm, preferably 3 to 70 μm. When the cathode and the anode satisfies such a thickness range, a sufficient amount of an active material is provided in the layer of an electrode material to prevent a battery capacity from being lowered and improve cycle and rate characteristics.

Meanwhile, the first electrodes may consist of a single layer of cathode, and the second electrodes may consist of a single layer of anode.

Also, the first electrodes may comprise one or more cathodes, one or more anodes, and a separator interposed between the cathodes and the anodes to be laminated alternately so as to separate them, and the second electrodes may comprise one or more anodes, one or more cathodes, and a separator interposed between the anodes and the cathodes to be laminated alternately so as to separate them.

The separator may comprise a second porous polymer substrate, a third coating layer formed on one surface of the second porous polymer substrate and comprising a polymer binder, the third coating layer being faced with the cathodes, and a fourth coating layer formed on the other surface of the second porous polymer substrate and comprising a mixture a polymer binder and inorganic particles, the fourth coating layer being faced with the anodes and having a composition, a thickness and a porosity different from those of the third porous coating layer.

Thereby, the cathodes and the anodes present in the first electrodes and the second electrodes are each selectively faced with a requisite one of the different porous coating layers. From such a suitable match, the third porous coating layer being faced with the cathodes can enhance mechanical property and eventually improve battery safety, and the fourth porous coating layer being faced with the anode can prevent for pores of a porous substrate from being filled and closed with by-product generated in the anode, thereby inhibiting the acceleration of battery deterioration.

In the present disclosure, the third porous coating layer may have the same composition, thickness and porosity as the first porous coating layer, and the fourth porous coating layer may have the same composition, thickness and porosity as the second porous coating layer.

Further, the second porous polymer substrate may be the same as the first porous polymer substrate.

Figure 2:
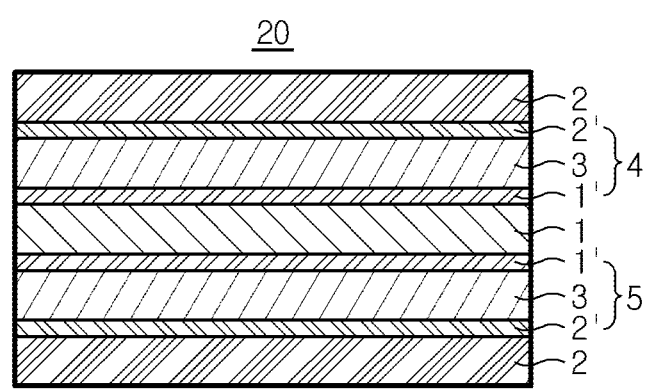
FIG. 2 shows a cross-section of a C-type bi-cell (a second bi-cell).
Figure 3:
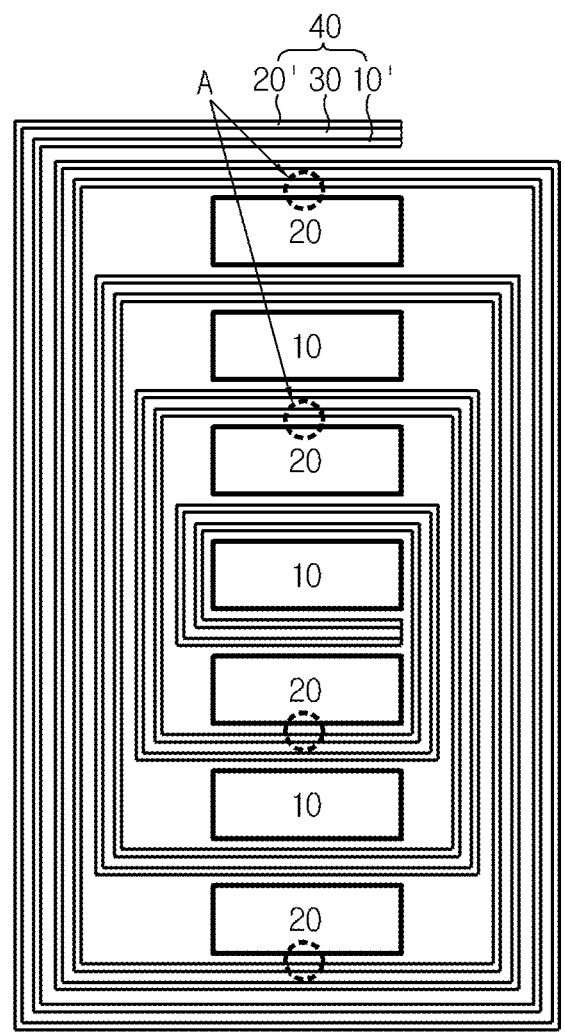
FIG. 3 schematically shows a cross-section of a conventional stack-folded electrode assembly.
Figure 4:
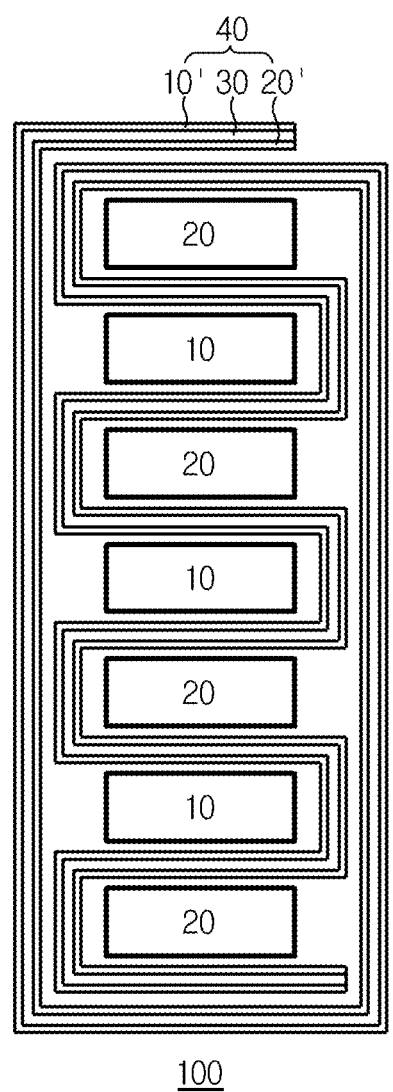
FIG. 4 schematically shows a cross-section of the zigzag-folded electrode assembly of the present disclosure.
Figure 5:
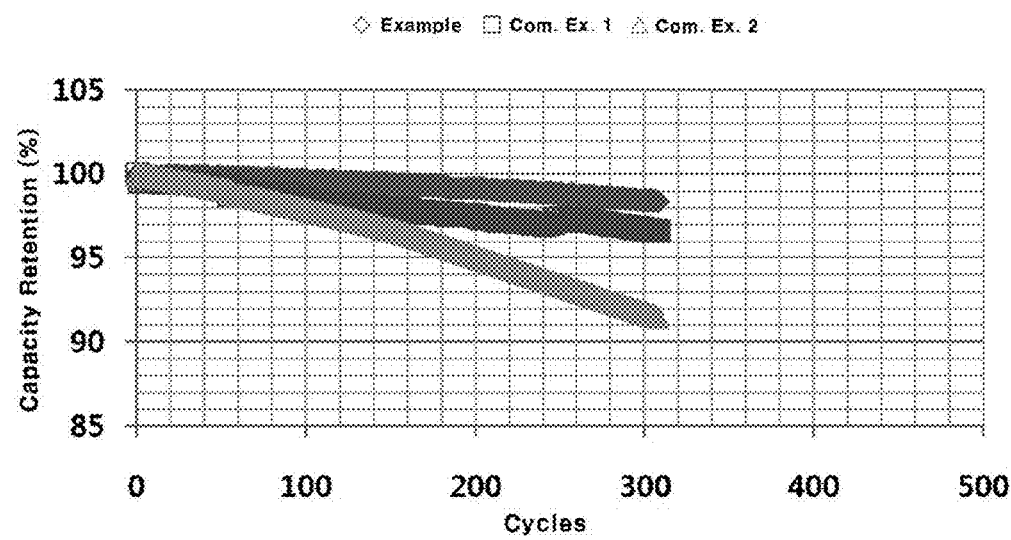
FIG. 5 is a graph showing capacity retention (%) of pouch-type polymer batteries prepared in the Example of the present disclosure and the Comparative Examples.

Meanwhile, FIG. 1 shows a cross-section of an A-type bi-cell (a first bi-cell), FIG. 2 shows a cross-section of a C-type bi-cell (a second bi-cell), FIG. 3 schematically shows a cross-section of a conventional stack-folded electrode assembly, and FIG. 4 schematically shows a cross-section of the zigzag-folded electrode assembly of the present disclosure.

Hereinafter, with reference to FIGS. 1 to 4, the characteristics of the zigzag-folded electrode assembly according to one embodiment of the present disclosure will be explained in combination with the conventional stack-folded electrode assembly.

In the A-type bi-cell (corresponding to the first bi-cell 10 of the present disclosure) shown in FIG. 1, a cathode 1, a first separator 4, an anode 2, a second separator 5, and a cathode 1 are laminated in order from the bottom. The first separator 3 is formed by laminating a third porous coating layer 1', a second porous polymer substrate 3, and a fourth porous coating layer 2', and the second separator 5 is formed by laminating a fourth porous coating layer 2', a second porous polymer substrate 3, and a third porous coating layer 1'.

In the C-type bi-cell (corresponding to the second bi-cell 20 of the present disclosure) shown in FIG. 2, an anode 2, a second separator 5, a cathode 1, a first separator 4, and an anode 2 are laminated in order from the bottom. The second separator 5 is formed by laminating a fourth porous coating layer 2', a second porous polymer substrate 3, and a third porous coating layer 1', and the first separator 4 is formed by laminating a third porous coating layer 1', a second porous polymer substrate 3, and a fourth porous coating layer 2'.

As mentioned above, the bi-cells 10, 20 are formed by coming each of the cathode 1 and the anode 2 into selective contact with the porous coating layer suitable thereto.

These bi-cells 10, 20 are combined with a long separator sheet 40 having a first porous coating layer 10' and a second porous coating layer 20' formed on both surface thereof, to compose a conventional stack-folded electrode assembly as shown in FIG. 3. In this conventional stack-folded electrode assembly, a mismatch between the electrodes and the porous coating layers may bring about. For example, in the case of the C-type bi-cell (the second bi-cell 20) in which an anode exists in both the outermost surfaces, the anode should be faced with the second porous coating layer, but may be faced with the first coating layer. Four 'A' parts indicated by circle in FIG. 3 refer to mismatched parts in the second bi-cell 20.

In this regard, the mismatching percentage (%) on the number of bi-cells in a convention stack-folded electrode assembly is shown in Tables 1 and 2 below. In Table 1, the total number (n) of bi-cells satisfies the condition that n+1 goes a multiple of 4, and in Table 2, the total number (n) of bi-cells satisfies the condition that n−1 goes a multiple of 4.

TABLE 1

| | Number of Bi-cells | | | | | | | | | |
|---|---|---|---|---|---|---|---|---|---|---|
| | 3 | 7 | 11 | 15 | 19 | 23 | 27 | 31 | 35 | 39 |
| Number of C-type Bi-cells | 2 | 4 | 6 | 8 | 10 | 12 | 14 | 16 | 18 | 20 |
| Number of Surfaces of Anode being faced with Separator Sheet | 4 | 8 | 12 | 16 | 20 | 24 | 28 | 32 | 36 | 40 |
| Number of Mismatched Surfaces of Anode being faced with Separator Sheet | 2 | 4 | 6 | 8 | 10 | 12 | 14 | 16 | 18 | 20 |
| Percentage (%) of Mismatched Surfaces relative to Anode Surfaces being faced with Separator Sheet | 50 | 50 | 50 | 50 | 50 | 50 | 50 | 50 | 50 | 50 |
| Number of Total Anode Surfaces (total number of anodes × 2) | 10 | 22 | 34 | 46 | 58 | 70 | 82 | 94 | 106 | 118 |
| Percentage (%) of Mismatched Surfaces relative to Total Anode Surfaces | 20.0 | 18.2 | 17.6 | 17.4 | 17.2 | 17.1 | 17.0 | 17.0 | 16.9 | 16.9 |

TABLE 2

| | Number of Bi-cells | | | | | | | | | |
|---|---|---|---|---|---|---|---|---|---|---|
| | 5 | 9 | 13 | 17 | 21 | 25 | 29 | 33 | 37 | 41 |
| Number of C-type Bi-cells | 3 | 5 | 7 | 9 | 11 | 13 | 15 | 17 | 19 | 21 |
| Number of Surfaces of Anode being faced with Separator Sheet | 6 | 10 | 14 | 18 | 22 | 26 | 30 | 34 | 38 | 42 |
| Number of Mismatched Surfaces of Anode being faced with Separator Sheet | 2 | 4 | 6 | 8 | 10 | 12 | 14 | 16 | 18 | 20 |
| Percentage (%) of Mismatched Surfaces relative to Anode Surfaces being faced with Separator Sheet | 33.3 | 40.0 | 42.9 | 44.4 | 45.5 | 46.2 | 46.7 | 47.1 | 47.4 | 47.6 |
| Number of Total Anode Surfaces (total number of anodes × 2) | 16 | 28 | 40 | 52 | 64 | 76 | 88 | 100 | 112 | 124 |
| Percentage (%) of Mismatched Surfaces relative to Total Anode Surfaces | 12.5 | 14.3 | 15.0 | 15.4 | 15.6 | 15.8 | 15.9 | 16.0 | 16.1 | 16.1 |

As can be confirmed from Tables 1 and 2, according to conventional stack-folding method, there are anodes that are faced with the separator sheet 40 but come into contact with the first porous coating layer (10'), i.e., being mismatched.

Meanwhile, in accordance with one aspect of the present disclosure, there is provided a zigzag-folded electrode assembly 100, comprising a plurality of first bi-cells 10, each first bi-cell having a cathode 1, a first separator 4, an anode 2, a second separator 5, and a cathode 1 that are laminated in order; a plurality of second bi-cells 20, each second bi-cell having an anode 2, a second separator 5, a cathode 1, a first separator 4, and an anode 2 that are laminated in order; and a separator sheet 40 interposed between the first bi-cells 10 and the second bi-cells 20 to be laminated alternately so as to separate them and having multiple folded portions in a zigzag form, wherein the separator sheet 40 comprises a first porous polymer substrate 30, a first coating layer 10' formed on one surface of the first porous polymer substrate 30 and comprising a polymer binder, the first coating layer 10' being faced with the cathodes 1, and a second coating layer 20' formed on the other surface of the first porous polymer substrate 30 and comprising a mixture a polymer binder and inorganic particles, the second coating layer 20' being faced with the anodes and having a composition, a thickness and a porosity different from those of the first porous coating layer 10', and the first separator 4 and the second separator 5 each independently comprise a second porous polymer substrate 3, a third coating layer 1' formed on one surface of the second porous polymer substrate 3 and comprising a polymer binder, the third coating layer 1' being faced with the cathodes, and a fourth coating layer 2' formed on the other surface of the second porous polymer substrate 3 and comprising a mixture a polymer binder and inorganic particles, the fourth coating layer 2' being faced with the anodes and having a composition, a thickness and a porosity different from those of the third porous coating layer 1'.

The mismatching percentage (%) on the number of bi-cells in the zigzag-folded electrode assembly according to one embodiment of the present disclosure is shown in Table 3 below.

Thereby, the porous coating layer being faced with the anode can prevent for pores of a porous substrate from being filled with by-product generated in the anode, and another porous coating layer being faced with the cathode can enhance mechanical property and eventually improve battery safety.

Further, in accordance with still another aspect of the present invention, there is provided a lithium secondary battery, comprising an electrode assembly, a non-aqueous electrolyte solution to be impregnated into the electrode assembly; and a battery case for receiving the electrode assembly and the non-aqueous electrolyte solution, wherein the electrode assembly is the above-mentioned electrode assembly.

In the present disclosure, the non-aqueous electrolyte solution comprises an organic solvent and an electrolyte salt being a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2 N^-$.

The organic solvent used in the non-aqueous electrolyte solution may be any one which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof is representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

TABLE 3

| | Number of Bi-cells | | | | | | | | | |
|---|---|---|---|---|---|---|---|---|---|---|
| | 3 | 5 | 7 | 9 | 11 | 13 | 15 | 17 | 19 | 21 |
| Number of C-type Bi-cells | 2 | 3 | 4 | 5 | 6 | 7 | 8 | 9 | 10 | 11 |
| Number of Surfaces of Anode being faced with Separator Sheet | 4 | 6 | 8 | 10 | 12 | 14 | 16 | 18 | 20 | 22 |
| Number of Mismatched Surfaces of Anode being faced with Separator Sheet | 0 | 0 | 0 | 0 | 0 | 0 | 0 | 0 | 0 | 0 |
| Percentage (%) of Mismatched Surfaces relative to Anode Surfaces being faced with Separator Sheet | 0 | 0 | 0 | 0 | 0 | 0 | 0 | 0 | 0 | 0 |
| Number of Total Anode Surfaces (total number of anodes × 2) | 10 | 16 | 22 | 28 | 34 | 40 | 46 | 52 | 58 | 64 |
| Percentage (%) of Mismatched Surfaces relative to Total Anode Surfaces | 0 | 0 | 0 | 0 | 0 | 0 | 0 | 0 | 0 | 0 |

According to the present disclosure, the separator sheet 40 having multiple portions folded in a zigzag form is applied in the zigzag-folded electrode assembly 100, thereby providing no mismatch between the electrodes and the porous coating layers.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. Example

(1) Preparation of Cathode

To N-methylpyrrolidone used as a solvent, $Li(Li_{0.2}Mn_{0.55}Ni_{0.15}Co_{0.1})O_2$ as a cathode active material, Denka black as a conductive material, and PVDF as a binder were added in a ratio of 90:5:5 to obtain a slurry, and the slurry was coated on an Al-foil having a thickness of 20 μm as a cathode current collector, followed by rolling and drying, to prepare a cathode.

(2) Preparation of Anode

To deionized water used as a solvent, 96 wt % of natural graphite as an anode active material, 3 wt % of PVDF as a binder, and 1 wt % of Denka black as a conductive material were added to obtain a slurry, and the slurry was coated on a Cu-foil having a thickness of 10 μm as an anode current collector, followed by rolling and drying, to prepare an anode.

(3) Preparation of Separator and Separator Sheet 80 wt % of $Al_2O_3$ and 20 wt % of PVDF were mixed and the mixture was dispersed in an acetone solvent to obtain a slurry for a first porous coating layer. 60 wt % of $Al_2O_3$ and 40 wt % of PVDF were mixed and the mixture was dispersed in an acetone solvent to obtain a slurry for a second porous coating layer. The obtained slurries were each coated on different surfaces of a three-layered porous substrate of polypropylene/polyethylene/polypropylene (PP/PE/PP). That is, the slurry for the first porous coating layer was coated on one surface of the porous coating layer, while the slurry for the second coating layer was coated on the other surface of the porous coating layer. The slurry coating was conducted to the thickness ratio of the first porous coating layer and the second porous coating layer be 1:9, and the porosity of the first porous coating layer and that of the second porous coating layer to be 40% and 60%, respectively.

(4) Preparation of Non-Aqueous Electrolyte Solution

Ethylene carbonate (EC), propylene carbonate (PC) and diethyl carbonate (DEC) were used in the ratio of 30:20:50 (wt %), in which lithium hexafluorophosphate was dissolved until 1M $LiPF_6$ solution was obtained, to prepare a non-aqueous electrolyte solution.

(5) Assembling of Lithium Secondary Battery

The cathode, the anode, the separator, and the separator sheet were used to assemble a polymer pouch-type battery having a 40 Ah capacity at 1 C discharge rate and comprising total 23 bi-cells, in a zigzag folded form as shown in FIG. 4. The assembling was conducted by coming the surface of the separator having a thicker porous coating layer into contact with the anode, and then the non-aqueous electrolyte solution was introduced, to obtain a lithium secondary battery.

(6) Activation of Lithium Secondary Battery

The battery prepared above was charged up to 3.8 V, and then a portion of the battery case was cut, degassing was conducted for 2 seconds under vacuum (−95 kPa), and the battery case was sealed. Subsequently, the battery was charged with 0.1 C up to 4.5 V under CC/CV conditions and discharged with 0.1 C up to 2.5 V under CC conditions, and then a portion of the sealed battery case was cut, degassing was conducted for 2 seconds under vacuum (−95 kPa), and the cutting portion was again sealed with heat and pressure, thereby preparing a lithium secondary battery finally.

2. Comparative Example 1

The preparation and activation procedures of the Example were repeated except that the assembling was conducted by a stack and folding manner, to prepare a lithium secondary battery. In the battery prepared thus, it was confirmed that there were 12 mismatched surfaces between the separator sheet and the outermost anodes of the bi-cells.

3. Comparative Example 2

(1) A cathode, an anode, and a non-aqueous electrolyte solution were prepared by the same method as the Example.

(2) Preparation of Separator and Separator Sheet 70 wt % of $Al_2O_3$ and 30 wt % of PVDF were mixed and the mixture was dispersed in an acetone solvent to obtain a slurry for a porous coating layer. The obtained slurry was coated on both surfaces of a three-layered porous substrate of polypropylene/polyethylene/polypropylene (PP/PE/PP). The slurry coating was conducted to the thickness ratio of the porous coating layers on both surfaces of the porous substrate to be 5:5, and the porosity of each porous coating layer to be 50%.

(3) Assembling and Activation of Lithium Secondary Battery

The cathode, the anode, the separator, and the separator sheet were used to assemble a polymer pouch-type battery having a 40 Ah capacity at 1 C discharge rate and comprising total 23 bi-cells, in a stack-folded form as shown in FIG. 3, and the non-aqueous electrolyte solution was introduced, to obtain a lithium secondary battery.

Then, the activation procedure was conducted by the same method as the Example.

4. Evaluation of Battery Cycle Characteristics

After activation in the Example and the Comparative Examples, each polymer pouch-type battery was repeatedly charged and discharged at 45° C. under the conditions of 1 C charge (4.35 V CC/CV, cut-off 0.05 C) and 1 C discharge (2.5 V CC/CV, cut-off), and then measured for its capacity retention over cycles.

FIG. 1 is a graph showing capacity retention (%) of polymer pouch-type batteries prepared in the Example and the Comparative Examples 1 and 2.

From FIG. 1, the battery of the Example was confirmed to exhibit superior life characteristics over those of Comparative Examples 1 and 2.

5. Evaluation of Battery Safety

After activation in the Example and the Comparative Examples, each polymer pouch-type battery was charged under the conditions of 1 C (4.35 V CC/CV, cut-off 0.05 C). Each battery is fixed between bakelite plates, and exposed in a chamber (55° C.) for 3 hours. Then, a nail with a sharp point (Diameter 3 mm, Length of pointed portion 6 mm, made of stainless steel) was completely penetrated into the battery at a rate of 80 mm/sec, and the temperature of each battery was measured.

Figure 6:
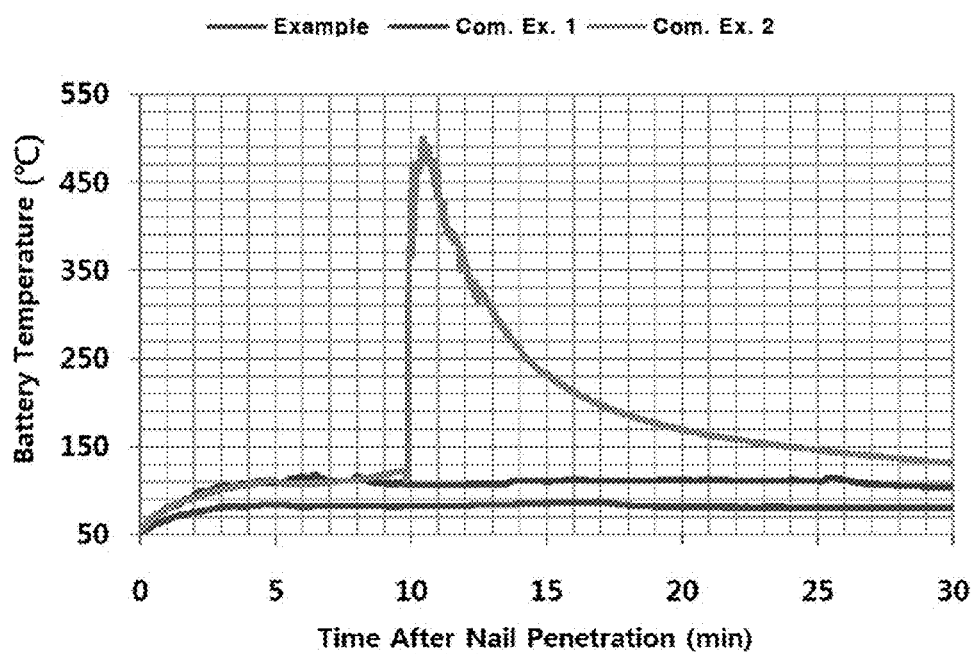
FIG. 6 is a graph showing temperature change after nail penetration test for pouch-type polymer batteries prepared in the Example of the present disclosure and the Comparative Examples.

FIG. 6 is a graph showing temperature change after nail penetration test for pouch-type polymer batteries prepared in the Example of the present disclosure and the Comparative Examples.

From FIG. 6, the batteries of the Example and Comparative Example 1 were not subject to ignition, whereas the battery of Comparative Example 2 went through ignition in about 10 minutes after nail penetration. Also, the battery of the Example exhibited a battery temperature lower than that of Comparative Example 1, from which the battery of the Example was confirmed to have superior safety over those of Comparative Examples 1 and 2.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. An electrode assembly, comprising:
   one or more first electrodes comprising one or more cathodes, one or more anodes, and a separator interposed between the cathodes and the anodes to be laminated alternately so as to separate them;
   one or more second electrodes comprising one or more anodes; and
   a separator sheet interposed between the first electrodes and the second electrodes to be laminated alternately so as to separate them and having multiple folded portions,
   wherein the separator sheet comprises a first porous polymer substrate, a first coating layer formed on one surface of the first porous polymer substrate and comprising a polymer binder, the first coating layer being faced with at least one of the cathodes of the first electrodes, and a second coating layer formed on the other surface of the first porous polymer substrate and comprising a mixture a polymer binder and inorganic particles, the second coating layer being faced with at least one of the anodes of the second electrodes and having a composition, a thickness and a porosity different from those of the first porous coating layer,
   wherein the separator comprises a second porous polymer substrate, a third coating layer formed on one surface of the second porous polymer substrate and comprising a polymer binder, the third coating layer being faced with at least one of the cathodes of the first electrodes, and a fourth coating layer formed on the other surface of the second porous polymer substrate and comprising a mixture of a polymer binder and inorganic particles, the fourth coating layer being faced with at least one of the anodes of the first electrodes and having a composition, a thickness and a porosity different from those of the third porous coating layer, and
   wherein the thickness ratio of the first porous coating layer and the second porous coating layer ranges from 1:9 to 4:6, and the thickness ratio of the third porous coating layer and the fourth porous coating layer ranges from 1:9 to 4:6.

2. The electrode assembly according to claim 1, wherein the multiple folded portions in the separator sheet is obtained by folding in a zigzag form, and the electrode assembly has a zigzag-folded structure.

3. The electrode assembly according to claim 1, wherein the first porous coating layer has a porosity of 20 to 50%, and the second porous coating layer has a porosity of 30 to 60%.

4. The electrode assembly according to claim 1, wherein the first porous coating layer further comprises inorganic particles.

5. The electrode assembly according to claim 1, wherein the inorganic particles are inorganic particles having a dielectric constant of 5 or higher, inorganic particles having the ability to transport lithium ions, or a mixture thereof.

6. The electrode assembly according to claim 5, wherein the inorganic particles having a dielectric constant of 5 or higher are any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$, $TiO_2$, $SiO_2$, $AlOOH$, $Al(OH)_3$, and a mixture thereof.

7. The electrode assembly according to claim 5, wherein the inorganic particles having the ability to transport lithium ions are any one selected from the group consisting of lithium phosphate ($Li_3PO_4$), lithium titanium phosphate (LixTiy(PO4)3, 0<x<2, 0<y<3), lithium aluminum titanium phosphate (LixAlyTiz(PO4)3, 0<x<2, 0<y<1, 0<z<3), (LiAlTiP)xOy type glass (0<x<4, 0<y<13), lithium lanthanum titanate (LixLayTiO3, 0<x<2, 0<y<3), lithium germanium thiophosphate (LixGeyPzSw, 0<x<4, 0<y<1, 0<z<1, 0<w<5), lithium nitride (LixNy, 0<x<4, 0<y<2), SiS2 type glass (LixSiySz, 0<x<3, 0<y<2, 0<z<4), P2S5 type glass (LixPySz, 0<x<3, 0<y<3, 0<z<7), and a mixture thereof.

8. The electrode assembly according to claim 1, wherein the polymer binder is selected from the group consisting of polyvinylidene fluoride (PVDF), hexafluoro propylene (HFP), polyvinylidene fluoride-co-hexafluoro propylene, polyvinylidene fluoride-co-trichloroethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

9. The electrode assembly according to claim 1, wherein the first porous polymer substrate is a polyolefin-based membrane or non-woven fabric.

10. The electrode assembly according to claim 1, wherein the first porous polymer substrate is made of any one selected from the group consisting of high-density polyethylene, low-density polyethylene, linear low-density polyethylene, ultra-high molecular weight polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

11. The electrode assembly according to claim 1, wherein the first porous polymer substrate is formed in a single layer, or in a lamination of two or more layers.

12. The electrode assembly according to claim 1, wherein at least one of the cathodes has a cathode active material comprising a lithium-containing oxide.

13. The electrode assembly according to claim 12, wherein the lithium-containing oxide is a lithium-containing transition metal oxide.

14. The electrode assembly according to claim 13, wherein the lithium-containing transition metal oxide is any one selected from the group consisting of LixCoO2 (0.5<x<1.3), LiXNiO2 (0.5<x<1.3), LixMnO2 (0.5<x<1.3), LixMn2O4 (0.5<x<1.3), Lix(NiaCobMnc)O2 (0.5<x<1.3, 0<a<1, 0<b<1, 0<c<1, a+b+c=1), LixNi1-yCoyO2 (0.5<x<1.3, 0<y<1), LixCo1-yMnyO2 (0.5<x<1.3, 0<y<1), LixNi1-yMnyO2 (0.5<x<1.3, 0<y<1), Lix(NiaCobMnc)O4 (0.5<x<1.3, 0<a<2, 0<b<2, 0<c<2, a+b+c=2), LixMn2-zNizO4 (0.5<x<1.3, 0<z<2), LixMn2-zCozO4 (0.5<x<1.3, 0<z<2), LixCoPO4 (0.5<x<1.3), LixFePO4 (0.5<x<1.3), and a mixture thereof.

15. The electrode assembly according to claim 1, wherein the at least one of the anodes has an anode active material comprising metallic lithium, a carbon-based material, a metal compound or a mixture thereof.

16. The electrode assembly according to claim 15, wherein the metal compound is a compound containing at least one metal selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

17. The electrode assembly according to claim 1, wherein the first electrodes consist of a single layer of cathode.

18. The electrode assembly according to claim 1, wherein the second electrodes consist of a single layer of anode.

19. The electrode assembly according to claim 1, wherein the third porous coating layer has a porosity of 20 to 50%, and the fourth porous coating layer has a porosity of 30 to 60%.

20. The electrode assembly according to claim 1, wherein the first porous coating layer and the third porous coating layer have the same composition, thickness and porosity, and the second porous coating layer and the fourth porous coating layer have the same composition, thickness and porosity.

21. The electrode assembly according to claim 1, wherein the second electrodes comprise one or more anodes, one or more cathodes, and a second separator interposed between the anodes and the cathodes to be laminated alternately so as to separate them.

22. The electrode assembly according to claim 21, wherein the second separator comprises a second porous polymer substrate, a third coating layer formed on one surface of the second porous polymer substrate and comprising a polymer binder, the third coating layer being faced with at least one of the cathodes of the second electrodes, and a fourth coating layer formed on the other surface of the second porous polymer substrate and comprising a mixture a polymer binder and inorganic particles, the fourth coating layer being faced with at least one of the anodes of the second electrodes and having a composition, a thickness and a porosity different from those of the third porous coating layer.

23. A zigzag-folded electrode assembly, comprising:
   a plurality of first bi-cells, each first bi-cell having a cathode, a first separator, an anode, a second separator, and a cathode that are laminated in order;
   a plurality of second bi-cells, each second bi-cell having an anode, a second separator, a cathode, a first separator, and an anode that are laminated in order; and
   a separator sheet interposed between the first bi-cells and the second bi-cells to be laminated alternately so as to separate them and having multiple folded portions in a zigzag form,
   wherein the separator sheet comprises a first porous polymer substrate, a first coating layer formed on one surface of the first porous polymer substrate and comprising a polymer binder, the first coating layer being faced with the cathodes, and a second coating layer formed on the other surface of the first porous polymer substrate and comprising a mixture a polymer binder and inorganic particles, the second coating layer being faced with the anodes and having a composition, a thickness and a porosity different from those of the first porous coating layer, and
   the first separator and the second separator each independently comprise a second porous polymer substrate, a third coating layer formed on one surface of the second porous polymer substrate and comprising a polymer binder, the third coating layer being faced with the cathodes, and a fourth coating layer formed on the other surface of the second porous polymer substrate and comprising a mixture a polymer binder and inorganic particles, the fourth coating layer being faced with the anodes and having a composition, a thickness and a porosity different from those of the third porous coating layer.

24. A lithium secondary battery, comprising:
the electrode assembly according to claim 1,
a non-aqueous electrolyte solution to be impregnated into the electrode assembly; and
a battery case for receiving the electrode assembly and the non-aqueous electrolyte solution.

25. The electrode assembly according to claim 23, wherein the thickness ratio of the first porous coating layer and the second porous coating layer ranges from 1:9 to 4:6.

26. The electrode assembly according to claim 23, wherein the thickness ratio of the third porous coating layer and the fourth porous coating layer ranges from 1:9 to 4:6.

27. The electrode assembly according to claim 23, wherein the thickness ratio of the first porous coating layer and the second porous coating layer ranges from 1:9 to 4:6, and the thickness ratio of the third porous coating layer and the fourth porous coating layer ranges from 1:9 to 4:6.

* * * * *